United States Patent [19]

Matsuno

[11] Patent Number: 4,636,904
[45] Date of Patent: Jan. 13, 1987

[54] HERMETICALLY SEALED MAGNETIC DISK CARTRIDGE

[75] Inventor: Takeshi Matsuno, Narashino, Japan

[73] Assignee: Seiko Seiki Kabushiki Kaisha, Chiba, Japan

[21] Appl. No.: 652,821

[22] Filed: Sep. 20, 1984

[30] Foreign Application Priority Data

Sep. 20, 1983 [JP] Japan .................. 58-173378

[51] Int. Cl.⁴ ............................ G11B 23/02
[52] U.S. Cl. ................................... 360/133
[58] Field of Search ........................ 360/133

[56] References Cited

U.S. PATENT DOCUMENTS 3,715,739 2/1973 Van Acker .................... 360/133
4,084,200 4/1978 Adair et al. .................. 360/133
4,320,425 3/1982 Hall ............................ 360/133
4,490,764 12/1984 Butz ............................ 360/133

Primary Examiner—Robert S. Tupper
Attorney, Agent, or Firm—Robert E. Burns; Emmanuel J. Lobato; Bruce L. Adams

[57] ABSTRACT

A magnetic disk cartridge has a plastic cartridge case which houses a magnetic disk. The magnetic disk is connected to a disk hub which projects through an opening in the bottom of the cartridge case. An upwardly extending tapered wall extends around the periphery of the opening, and a tapered plastic ring is attached to and encircles the disk hub. During non-use of the magnetic disk cartridge, a spring urges the disk hub downwardly so that the tapered plastic ring frictionally engages with the tapered wall with a wedging action to seal the clearance formed at the opening between the disk hub and the cartridge case. During use, the disk hub is displaced upwardly against the spring force to disengage the tapered plastic ring from the tapered wall and the disk hub is rotationally driven to rotate the magnetic disk.

3 Claims, 2 Drawing Figures

HERMETICALLY SEALED MAGNETIC DISK CARTRIDGE

BACKGROUND OF THE INVENTION

This invention relates to an improvement in a magnetic disk cartridge.

A magnetic disk cartridge has a diameter substantially equal to that of a floppy disk, but has a larger memory capacity, and can be driven at a higher speed. Moreover, access to its memory surface can be made by the use of a floating type of head. For these reasons, the magnetic disk cartridge has drawn increasing attention as a memory medium for a small computer and which could replace the floppy disk.

A prior-art magnetic disk cartridge has a construction such as shown in FIG. 1. The cartridge includes a magnetic disk 2 which is rotatably accommodated in a plastic cartridge case, and a disk hub 3 functioning also as an armature, and which holds firmly the center of rotation of the magnetic disk 2 and projects from an opening 1a defined in the bottom of the cartridge case. A latching lever 5 has a rear end portion pressed against the inner bottom surface of the case 1 by a leaf spring 4 and a forward end portion pressed into contact with a flange 3a formed around the disk hub 3, in such a manner that it fixes the disk hub 3 to the inner bottom surface of the cartridge case 1.

The disk hub 3 is held firmly in the case 1 together with the magnetic disk 2 by the latching lever 5 when the magnetic disk cartridge is not in use (shown on the left-hand side of FIG. 1).

When the cartridge case 1 is loaded into a magnetic disk driver, a release pin 6 provided in the driver pushes up a holding pin 5a of the latching lever 5, releasing the pressure on the disk hub 3. At the same time, an electromagnetic clutch provided at the end of a spindle motor 7 engages the lower surface of the hub 3, and the spindle motor 7 drives the magnetic disk to rotate at high speed (shown on the right-hand side of FIG. 1).

In a cartridge of this kind, however, there is a large dimensional tolerance between the diameter of the opening 1a and the outer diameter of the disk hub 3, and a wide gap is defined between them. This results in the problem that, even though the magnetic disk 2 and the disk hub 3 are held against the inner bottom of the cartridge case 1 by the spring force of the spring 4, the disk hub 3 can be displaced when handled or shaken roughly, so that the gap at the joint therebetween opens, and contamination due to dust, etc., enters in the cartridge case 1.

Contamination can also occur as a result of wear of the inner bottom portion of the plastic cartridge case 1 against the disk hub 3, which is made of a different material, for example, iron.

In a magnetic disk cartridge of this kind, the occurrence of contamination is a crucial problem. Since the magnetic disk is driven to rotate at high speed, the head is arranged to float by dynamic pressure while keeping at a distance of 0.3 $\mu$m from the magnetic disk. If fine dust enters the cartridge case, both the head and the recording surface could be damaged, so that data written on the disk will be destroyed, and head crashes as well as access errors will, occur.

SUMMARY OF THE INVENTION

The present invention is directed to eliminating the displacement between the disk hub and the opening of the case, to prevent contamination such as dust from entering into the case, and also to prevent the occurrence of contamination due to wear of the inner bottom portion of the cartridge case against the disk hub.

To accomplish the objects described above, according to the present invention, a tapered vertical wall is defined around the inner periphery of the opening of the cartridge case, and a tapered plastic ring engageable with the vertical wall is fitted around the outer periphery of the disk hub.

DETAILED DESCRIPTION OF THE INVENTION

Figure 1:
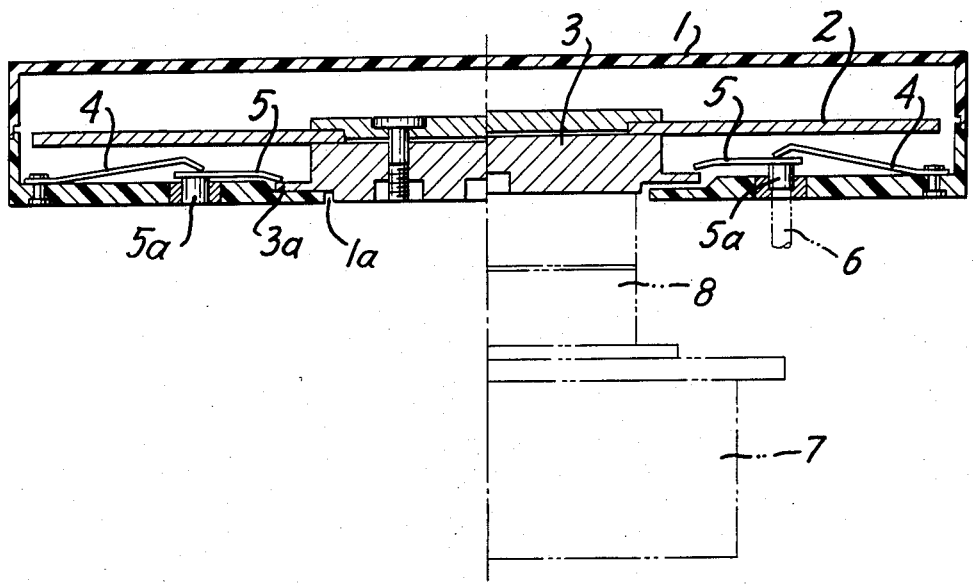
FIG. 1 is a schematic cross-sectional view of a conventional magnetic disk cartridge.
Figure 2:
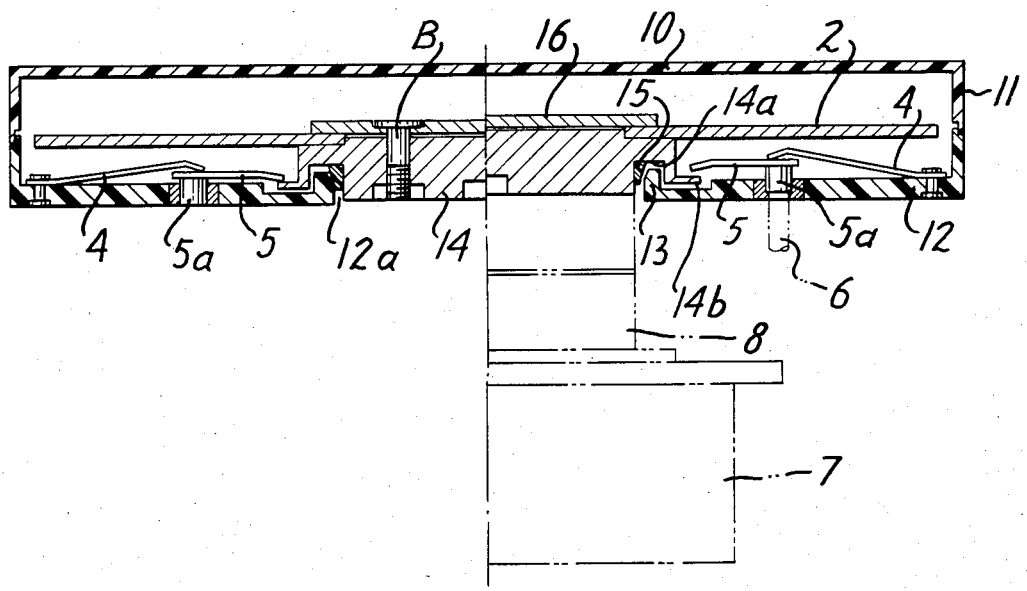
FIG. 2 is a schematic cross-sectional view of a magnetic disk cartridge in accordance with the present invention.

Hereinafter, one embodiment of the present invention will be described in detail with reference to FIG. 2. The same reference numerals are used to denote identical components to those in FIG. 1, and thus a further description of these components is omitted.

In the drawing, a cartridge case 10 has a split construction consisting of upper and lower covers 11 and 12, each made of injection-molded plastic.

An opening 12 is bored through the center of the lower cover 12, and a tapered vertical wall 13 whose diameter increases progressively upward is integrally formed around the opening 12a.

A groove 14a of annular shape is defined around the outer periphery of the projecting edge of the opening 12a of a disk hub 14 so as to face the vertical wall 13, and a tapered plastic ring 15 is attached to an encircles the disk hub 14 at the inner peripheral portion of the groove 14a. When the magnetic disk cartridge is not in use, shown on the left-hand side of the drawing, a flange 14b formed around the outermost periphery of the disk hub 14 engages with the latching lever 5, so that the flange 14b is pushed downwardly toward the inner bottom surface of the lower cover 12a by the spring force exerted by the spring 4. As a result, the tapered ring 15 wedges against and engages frictionally with the tapered vertical wall 13, and seals the opening 12a hermetically.

Since the vertical wall 13 and the ring 15 are made of plastic, they produce a large frictional force when engaged, and this engaged state is kept stably.

As shown on the right-hand side of the drawing, when the cartridge case 10 is loaded into a magnetic disk driver, the release pin 6 pushes up the holding pin 5a to release the locking of the disk hub 14, and at the same time, the electromagnetic clutch 8 engages with the disk hub 14, so that the ring 15 and the vertical wall 13 separate from each other and the magnetic disk 2 is rotated at high speed.

In this state, the disk hub 14 is driven to rotate in a floating state within the cartridge case 10, and a small gap is defined between the opening 12a and the disk hub 14. However, the labyrinth structure defined by the groove 14a, the ring 15, and the vertical wall 3 minimizes the entrance of contamination through the small space, and the interior of the case 10 can be kept clean.

In the drawing, reference numeral 16 denotes a clamp plate which is fixed onto the disk hub 14 by a bolt B to clamp and hold the magnetic disk 2.

As described in detail with reference to the above embodiment, the present invention can ensure that the magnetic disk is kept stable and air-tight when the magnetic disk cartridge is not in use, and can prevent the occurrence of contamination by the labyrinth structure defined between the opening of the case and the disk hub when the magnetic disk is rotating.

When not in use, the center of rotation of the disk hub is close to the center of the spindle, and displacement thereof is small. Accordingly, the engagement with the spindle by the electromagnetic clutch can be effected stably.

I claim:

1. A magnetic disk cartridge comprising: a plastic cartridge case having top and bottom walls and having an opening in the bottom wall defined by an upwardly extending tapered wall portion; a magnetic disk disposed within the cartridge case; a disk hub rotatably disposed within the cartridge case opening, the disk hub being displaceable upwardly and downwardly relative to the cartridge case, means connecting the magnetic disk to the disk hub to undergo movement therewith; spring means for resiliently urging the disk hub downwardly toward the bottom wall of the cartridge case; and a plastic ring attached to and encircling the disk hub, the plastic ring being configured to frictionally engage with and wedge against the tapered wall portion when the disk hub is urged downwardly by the spring means during non-use of the magnetic disk cartridge to thereby hermetically seal the opening and to disengage from the tapered wall portion when the disk hub is displaced upwardly relative to the cartridge case during use of the magnetic disk cartridge to thereby permit rotation of the disk hub and magnetic disk within the cartridge case.

2. A magnetic disk cartridge according to claim 1; wherein the plastic ring has a peripherally extending tapered portion which complements that of the tapered wall portion to effect a wedging action between the two tapered portions.

3. A magnetic disk cartridge according to claim 1; wherein the disk hub has an annular groove in which is disposed the plastic ring and into which projects the tapered wall portion of the cartridge case bottom wall.

* * * * *